United States Patent
Wang (10) Patent No.: US 12,502,091 B2
(45) Date of Patent: Dec. 23, 2025

(54) HEAD-MOUNTED APPARATUS AND SENSING METHOD

(71) Applicant: PIXART IMAGING INC., Hsin-Chu (TW)

(72) Inventor: Tsung-Fa Wang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 291 days.

(21) Appl. No.: 18/382,554

(22) Filed: Oct. 23, 2023

(65) Prior Publication Data

US 2025/0127411 A1    Apr. 24, 2025

(51) Int. Cl.
| | |
|---|---|
| *A61B 5/00* | (2006.01) |
| *A61B 5/021* | (2006.01) |
| *A61B 5/026* | (2006.01) |
| *G02C 5/12* | (2006.01) |
| *G02C 11/00* | (2006.01) |
| *G02C 11/04* | (2006.01) |

(52) U.S. Cl.
CPC ........ *A61B 5/0261* (2013.01); *A61B 5/02141* (2013.01); *A61B 5/6814* (2013.01); *G02C 5/12* (2013.01); *G02C 11/04* (2013.01); *G02C 11/10* (2013.01)

(58) Field of Classification Search
CPC . A61B 5/0261; A61B 5/02141; A61B 5/6814; A61B 5/14551; A61B 5/6803; A61B 5/02416; A61B 5/02438; G02C 5/12; G02C 11/04; G02C 11/10; G02B 27/017; G02B 27/0176; G02B 2027/0178
See application file for complete search history.

(56) References Cited

U.S. PATENT DOCUMENTS

| | | | |
|---|---|---|---|
| 2021/0240250 A1* | 8/2021 | Okano ................... | G06F 1/3287 |
| 2023/0172468 A1* | 6/2023 | Kaplan ................... | A61B 5/332 |
| | | | 600/470 |

* cited by examiner

*Primary Examiner* — Eugene T Wu
(74) *Attorney, Agent, or Firm* — Li & Cai Intellectual Property (USA) Office (57) ABSTRACT

Head-mounted apparatus and a sensing method are provided. The head-mounted apparatus include a pair of frames, a bridge part, a pair of nose pads, a sensing device and a processing circuit. The sensing device includes a first light source and a first light sensor disposed in one of the pair of nose pads according to a first arrangement, and a second light source and a second light sensor disposed in another one of the pair of nose pads according to a second arrangement. The first arrangement is opposite to the second arrangement. The processing circuit is configured to determine whether or not the head-mounted apparatus is in a wearing state according to first through fourth sensed signals, and obtain a heart rate of a user by processing the first through fourth sensed signals.

20 Claims, 7 Drawing Sheets

HEAD-MOUNTED APPARATUS AND SENSING METHOD

FIELD OF THE DISCLOSURE

The present disclosure relates to a wearable device and a method, and more particularly to a head-mounted apparatus and a sensing method capable of avoiding false detection in a non-wearing state of the head-mounted apparatus.

BACKGROUND OF THE DISCLOSURE

Photoplethysmogram (PPG) signal is an optically obtained plethysmogram that is indicative of blood volume changes in the microvascular bed of tissue. The PPG signal is often obtained by using a pulse oximeter, which illuminates the skin and measures changes in light absorption.

Moreover, the existing wearable products can measure heart rate through the PPG signals. However, the heart rates are often mismeasured in non-wearing state of the wearable product. Even if the wearable product is in wearing state, the measurement may be inaccurate due to incomplete wearing.

For the existing smart glasses, same mismeasurement and inaccurate measurement issues may appear and need to be addressed urgently.

SUMMARY OF THE DISCLOSURE

In response to the above-referenced technical inadequacies, the present disclosure provides a head-mounted apparatus capable of avoiding false detection in a non-wearing state.

In order to solve the above-mentioned problems, one of the technical aspects adopted by the present disclosure is to provide a head-mounted apparatus, which includes a pair of frames, a bridge part, a pair of nose pads, a sensing device and a processing circuit. The bridge part is connected between the pair of frames. The pair of nose pads are connected to the pair of frames, respectively. The sensing device includes a first light source and a first light sensor disposed in one of the pair of nose pads according to a first arrangement, and a second light source and a second light sensor disposed in another one of the pair of nose pads according to a second arrangement. The first arrangement is opposite to the second arrangement. The processing circuit is electrically connected to the sensing device, and the processing circuit is configured to: control the first light source and the second light source to respectively emit a first test light and a second test light at different timings; receive a first sensed signal generated by the first light sensor and corresponding to the second test light; receive a second sensed signal generated by the second light sensor and corresponding to the first test light; receive a third sensed signal generated by the first light sensor and corresponding to the first test light; receive a fourth sensed signal generated by the second light sensor and corresponding to the second test light; determine whether or not the head-mounted apparatus is in a wearing state according to the first through fourth sensed signals, and obtain, in response to determining that the head-mounted apparatus is in the wearing state, a heart rate of a user by processing the first through fourth sensed signals.

In order to solve the above-mentioned problems, another one of the technical aspects adopted by the present disclosure is to provide a sensing method for a head-mounted apparatus. The head-mounted apparatus includes a pair of frames, a bridge part connected between the pair of frames, and a pair of nose pads connected to the pair of frames, respectively. The sensing method includes: providing a sensing device that includes a first light source and a first light sensor disposed in one of the pair of nose pads according to a first arrangement, and a second light source and a second light sensor disposed in another one of the pair of nose pads according to a second arrangement, in which the first arrangement is opposite to the second arrangement; and configuring a processing circuit to: control the first light source and the second light source to respectively emit a first test light and a second test light at different timings; receive a first sensed signal generated by the first light sensor and corresponding to the second test light; receive a second sensed signal generated by the second light sensor and corresponding to the first test light; receive a third sensed signal generated by the first light sensor and corresponding to the first test light; receive a fourth sensed signal generated by the second light sensor and corresponding to the second test light; determine whether or not the head-mounted apparatus is in a wearing state according to the first through fourth sensed signals, and obtain, in response to determining that the head-mounted apparatus is in the wearing state, a heart rate of a user by processing the first through fourth sensed signals.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
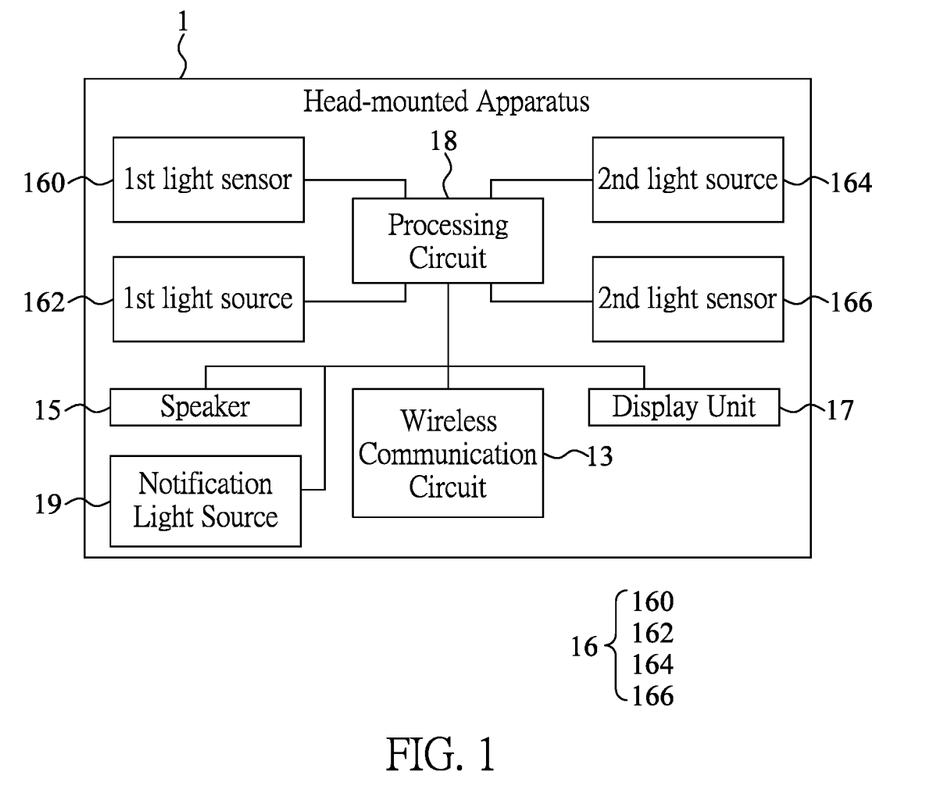
FIG. 1 is a functional block diagram of head-mounted apparatus according to one embodiment of the present disclosure.
Figure 2:
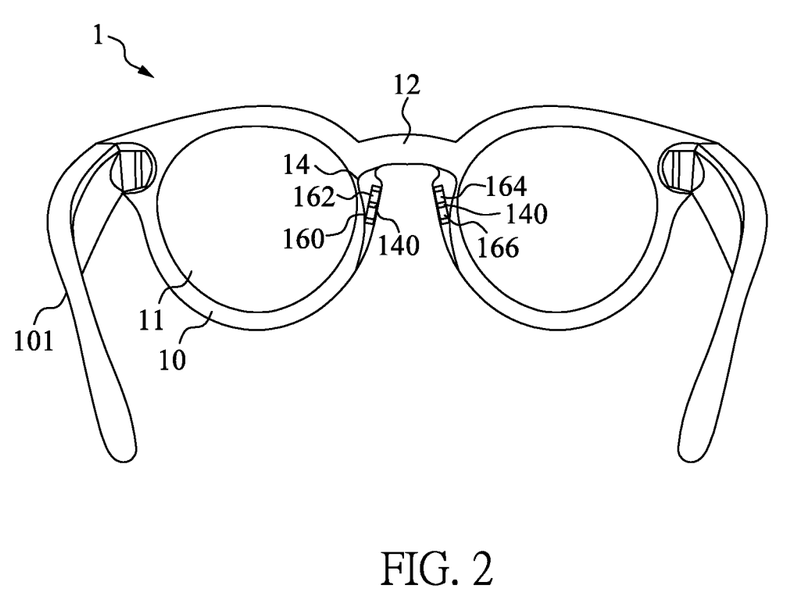
FIG. 2 is a perspective view of the head-mounted apparatus according to one embodiment of the present disclosure.

FIG. 1 is a functional block diagram of a head-mounted apparatus according to one embodiment of the present disclosure, and FIG. 2 is a perspective view of the head-mounted apparatus according to one embodiment of the present disclosure. Referring to FIGS. 1 and 2, one embodiment of the present disclosure provides a head-mounted apparatus 1, which can be a sensing glasses that includes a pair of frames 10, a bridge part 12, a pair of nose pads 14, a sensing device 16 and a processing circuit 18.

In FIG. 2, the head-mounted apparatus 1 utilizes a structure similar to that of the normal glasses typically used for vision correction. The pair of frames 10 can also be referred to as glass rims, which have a pair of glass lenses 11 embedded therein, and the bridge part 12 can be connected between the pair of frames 10.

The head-mounted apparatus 1 are further provided with a pair of glass temples 101 that are connected to the frames 10, respectively. The pair of nose pads 14 can each be disposed on a side of each frame 10, such that the nose pads 14 can abut against parts of a user's nose while the user wearing the head-mounted apparatus 1 (i.e., the head-mounted apparatus 1 are in a wearing state), thereby allowing a comfortable resting of the head-mounted apparatus 1 on the user's nose. In certain embodiments, a pair of pad arms can be optionally provided for connecting the nose pads 14 to the frames 10, but the present disclosure is not limited thereto, the nose pads 14 can be directly connected to the frames 10, respectively.

As shown in FIGS. 1 and 2, the sensing device 16 can include a first light source 160 and a first light sensor 162 disposed in one of the pair of nose pads 14 according to a first arrangement. For example, the first light source 160 and the first light sensor 162 can be disposed in the nose pad 14 on the left side, and the first arrangement represents that the first light sensor 162 is located above the first light source 160, that is, a height of the first light sensor 162 is greater than a height of the first light source 160, especially in the wearing state of the head-mounted apparatus 1.

Moreover, the sensing device 16 can further include a second light source 164 and a second light sensor 166 disposed in another one of the pair of nose pads 14 according to a second arrangement opposite to the first arrangement. For example, the second light source 164 and the second light sensor 166 can be disposed in the nose pad 14 on the right side, and the second arrangement represents that the second light source 164 is located above the second light sensor 166, that is, a height of the second light source 164 is greater than a height of the second light sensor 166, especially in the wearing state of the head-mounted apparatus 1. It should be noted that the first arrangement opposite to the second arrangement represents that a sequence of the first light source 160 and the first light sensor 162 along a gravity direction is opposite to a sequence of the second light source 164 and the second light sensor 166 along the gravity direction while the sensing glasses is in the wearing state.

The first light source 160 and the second light source 164 can each be, for example, a light-emitting diode (LED), and the first light sensor 162 and the second light sensor 166 can each be, for example, a photo diode (PD). In some embodiments, the first light source 160 and the first light sensor 162 can be integrated into a sensor circuit with a built-in LED, and so as the second light source 160 and the second light sensor 162.

In some embodiments, signal amplification circuits can be provided for the first light sensor 162 and the second light sensor 166 to amplify electrical signals therefrom, and optical guiding members can be disposed adjacent to the first light source 160 and the second light source 164, respectively, so as to guide emitted lights toward desired directions.

The processing circuit 18 is electrically connected to the sensing device, more specifically, is electrically connected to the first light source 160, the first light sensor 162, the second light source 164 and the second light sensor 166. The processing circuit 18 can include one or more control circuits, for example one or more dedicated controllers and/or one or more programmable general-purpose microprocessors. The processing circuit 18 can be configured to activate the light sensors and the light sources of the sensing device 16, coordinate operation of the light sensors and the light sources, and to receive output signals from the light sensors and/or any additional sensors included in the head-mounted apparatus 1.

In some embodiments, the processing circuit 18 can include at least one memory elements, which can include, for example, local memory employed during actual execution of the program code, bulk storage, and cache memories which may provide temporary storage of at least some program code.

To reduce a cross-interference between the first light source 160 and the first light sensor 162, a direct path between the first light sensor 162 and the first light source 160 can be blocked by a portion of the nose pad 14 at the left side, such as a separator 140 disposed between the first light sensor 162 and the first light source 160. Similarly, a second direct path between the second light source 164 and the second light sensor 166 is blocked by a portion of the nose pad 14 at the right side, such as another separator 140 disposed between the second light sensor 166 and the second light source 164, so as to reduce a cross-interference between the second light source 164 and the second light sensor 166.

Figure 3:
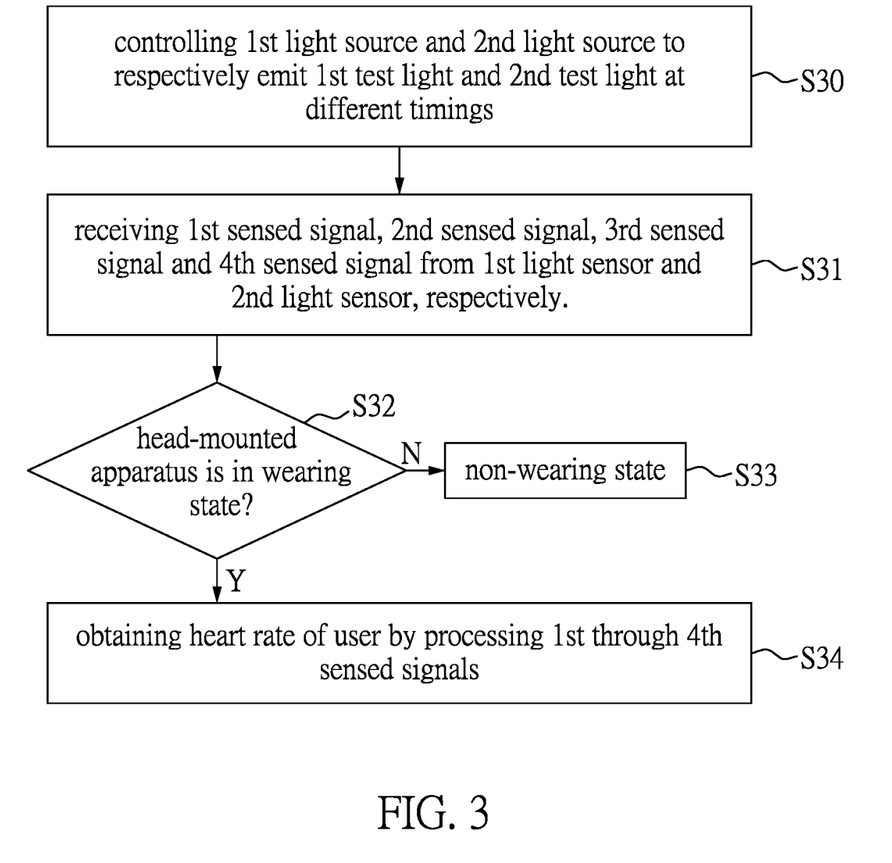
FIG. 3 is a flowchart of a sensing method according to one embodiment of the present disclosure.

Reference is made to FIG. 3, which is a flowchart of a sensing method according to one embodiment of the present disclosure. In another aspect, the present disclosure provides a sensing method applicable to the head-mounted apparatus 1 mentioned above. As shown in FIG. 3, the sensing method can include configuring the processing circuit to perform the following steps:

Step S30: controlling the first light source and the second light source to respectively emit a first test light and a second test light at different timings.

Figure 4:
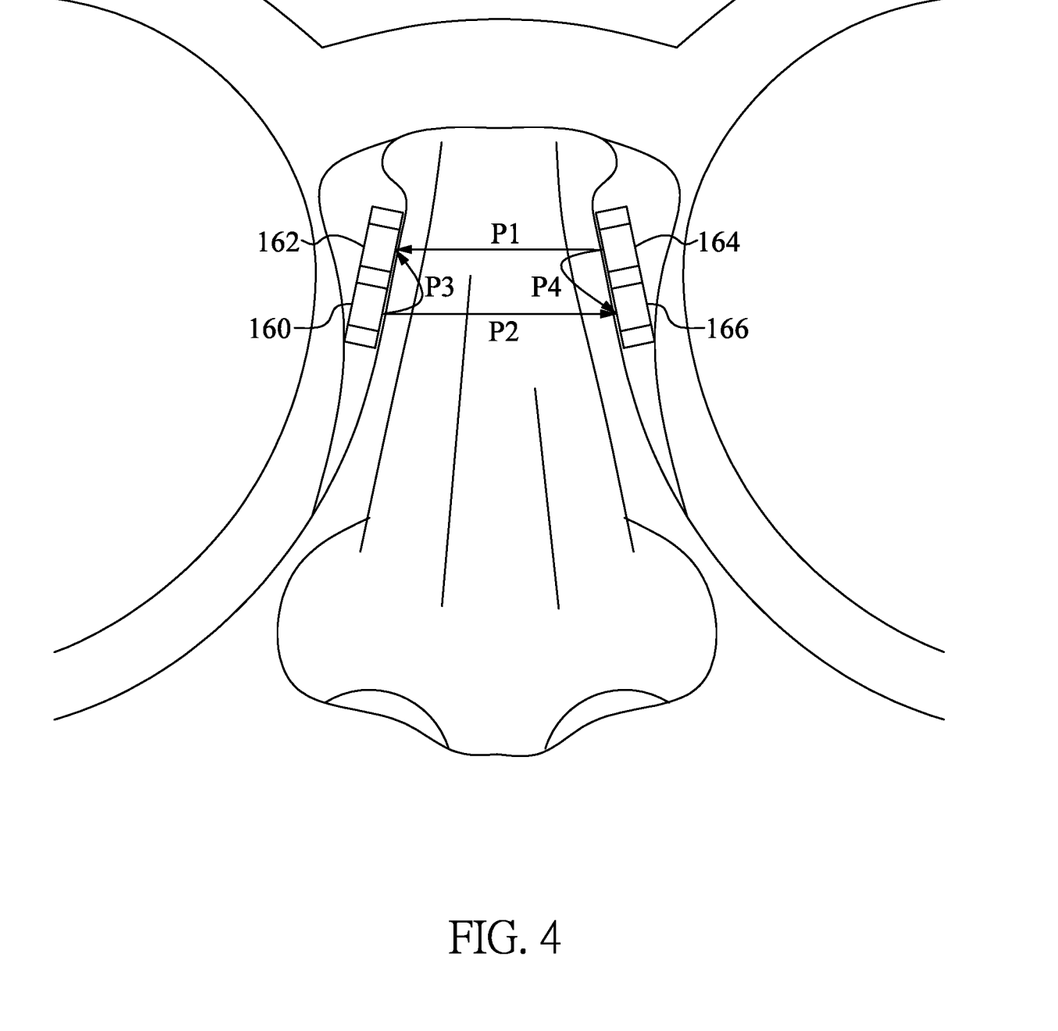
FIG. 4 is a schematic diagram showing that an operation of the sensing device in the wearing state of the head-mounted apparatus according to one embodiment of the present disclosure.
Figure 5:
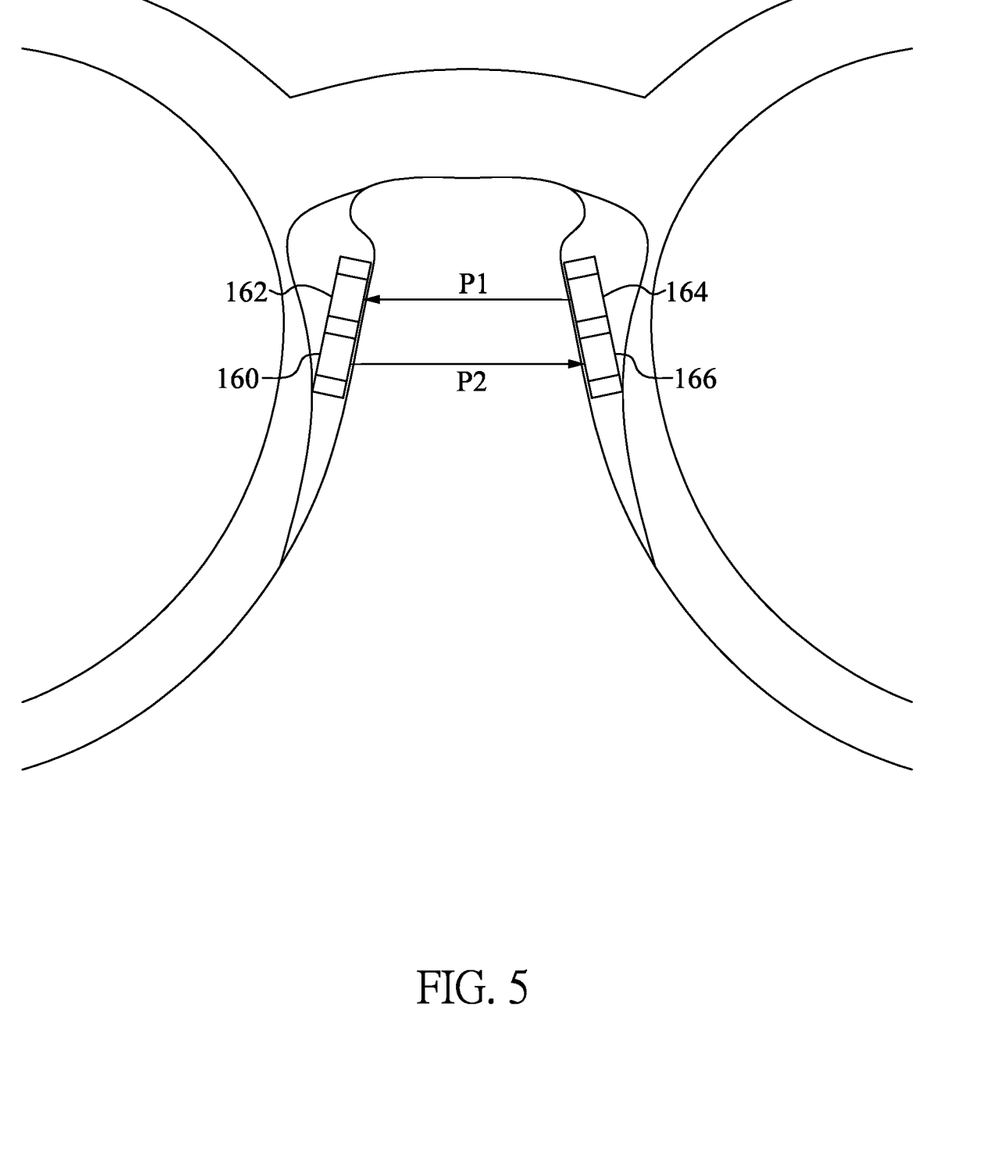
FIG. 5 is a schematic diagram showing that an operation of the sensing device in a non-wearing state of the head-mounted apparatus according to one embodiment of the present disclosure.

In this step, in order to clearly distinguish sources of test lights from each other, the first test light and the second test light are controlled to be emitted at different time points. Reference can be made to FIG. 4 and FIG. 5, FIG. 4 is a schematic diagram showing that an operation of the sensing device in the wearing state of the head-mounted apparatus according to one embodiment of the present disclosure, and FIG. 5 is a schematic diagram showing that an operation of the sensing device in a non-wearing state of the head-mounted apparatus according to one embodiment of the present disclosure.

As shown in FIGS. 4 and 5, the first test light emitted by the first light source 160 at a first time point can be received by the second light sensor 166 through a second path P2, and may or may not be received by the first light sensor 162 through a third path P3, that depends on whether or not the user's nose presences between the nose pads 14. More precisely, when the head-mounted apparatus 1 are in the wearing state, the first test light emitted by the first light source 160 at the first time point can be received by the first light sensor 162 through the third path P3 since the first test light is reflected by the user's nose; otherwise, the first test light may not be received by the first light sensor 162 or very few parts of the first test light may be received by the first light sensor 162.

Similarly, the second test light emitted by the second light source 160 at a second time point can be received by the first light sensor 162 through a first path P1, and may or may not be received by the second light sensor 166 through a fourth path P3, that depends on whether or not the user's nose presences between the nose pads 14.

It should be noted that a light control film (e.g., view control film, VCF) can be provided at a light emitting side of each of the first light source 160 and the second light source 164, so as to control a first ratio of an amount of light emitted toward the first light sensor 162 to an amount of light emitted toward the second light sensor 166 for the first light source 160, and control a second ratio of an amount of light received by the first light sensor 162 to an amount of light received by the second light sensor 166 for the second light source 164.

For example, since the first test light emitted along the second path P2 and the second test light emitted along the first path P1 need to be strong enough to penetrate the bridge of the nose, most of the amount of light emitted from the first light source 160 can be assigned to the direct path between the first light sensor 162 and the first light source 160, and most of the amount of light emitted from the second light source 164 can be assigned to the direct path between the second light sensor 166 and the second light source 164.

More specifically, taking the direct path between the first light sensor 162 and the first light source 160 as a reference angle with 0 degrees, the light control film can be disposed at the light emitting side of the first light source 160, so as to control, for the first light source 160, a light intensity within an inner angle range (e.g., from +5 to −5 degrees) to be stronger than a light intensity within an outer angle range (e.g., from +5 to +25 and −5 to −25 degrees).

The sensing method can therefore proceeds to step S31: receiving a first sensed signal, a second sensed signal, a third sensed signal, and a fourth sensed signal from the first light sensor and the second light sensor, respectively.

In step S31, the first sensed signal is generated by the first light sensor 162 and corresponding to the second test light, the second sensed signal is generated by the second light sensor 166 and corresponding to the first test light, the third sensed signal is generated by the first light sensor 162 and corresponding to the first test light, the fourth sensed signal is generated by the second light sensor 166 and corresponding to the second test light.

Moreover, when the user is wearing the sensing glasses on the user's nose (i.e., in the wearing state), the first sensed signal is generated by the first light sensor 162 that receives the second test light penetrating through the user's nose, the second sensed signal is generated by the second light sensor 166 that receives the first test light penetrating through the user's nose, the third sensed signal is generated by the first light sensor 162 that receives the first test light reflected from the user's nose, and the fourth sensed signal is generated by the second light sensor 166 that receives the second test light reflected from the user's nose.

Differently, when the user is not wearing the sensing glasses on the user's nose (i.e., the non-wearing state), since the first test light along the second path P2 and the second test light along the first path P1 only penetrating through the air, light intensities corresponding to the first sensed signal and the second sensed signal become stronger than those of the first sensed signal and the second sensed signal generated during the wearing state of the head-mounted apparatus 1. However, light intensities corresponding to the third sensed signal and the fourth sensed signal become extremely small (even approximately close to 0) since that the first test light and the second test light are not reflected by the user's nose.

Therefore, such changes in the intensities corresponding to the first sensed signal through the fourth sensed signal can be utilized to establish a detection table for wearing detection.

The sensing method proceeds to step S32: determining whether or not the sensing glasses is in a wearing state according to the first through fourth sensed signals.

Figure 6:
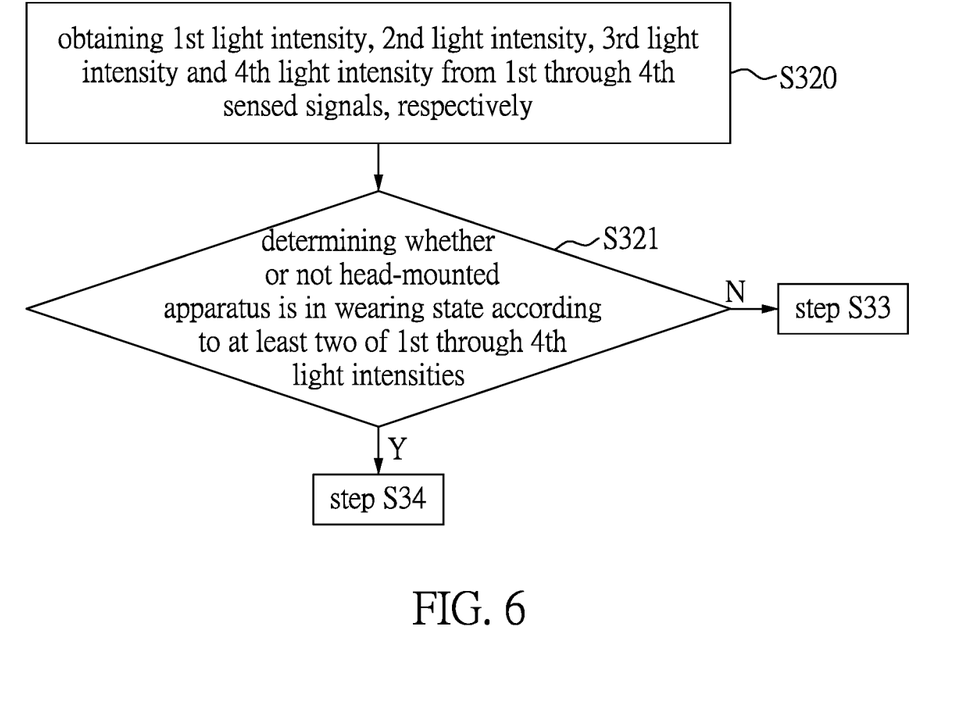
FIG. 6 is a detailed flowchart of step S32.

Reference can be made to FIG. 6, which is a detailed flowchart of step S32. As shown in FIG. 6, step S32 can include the following steps:

Step S320: obtaining a first light intensity, a second light intensity, a third light intensity and a fourth light intensity from the first through fourth sensed signals, respectively.

For example, the detection table can be established for the wearing state and the non-wearing state of the head-mounted apparatus 1 in advance, by measuring light intensities sensed by the first light sensor 162 and the second light sensor 166 at different timings when the first test light and the second test light are respectively emitted.

The detection table can therefore be established as the following table I:

TABLE I

| # of sensed signal | Intensity in wearing state | Intensity in non-wearing state |
|---|---|---|
| 1 | Weak | Strong |
| 2 | Weak | Strong |
| 3 | Strong | Extremely weak (~0) |
| 4 | Strong | Extremely weak (~0) |

It can be seen from table I that the wearing detection can be performed according to at least two of the first through fourth light intensities.

Step S321: determining whether or not the head-mounted apparatus is in the wearing state according to at least two of the first through fourth light intensities.

In one example, when the first light intensity or the second light intensity is larger than a first threshold, and the third light intensity or the fourth light intensity is smaller than a second threshold, it can be determined that the head-mounted apparatus are in the non-wearing state. It should be noted that the first threshold and the second threshold can be determined according to the light intensities measured during an establishment of the detection table.

In another example, the first through fourth light intensities are monitored in real-time, when the first light intensity is increased by a first value larger than a third threshold and the third intensity is decreased by a second value larger than a fourth threshold, it can be determined that the head-mounted apparatus is in the non-wearing state.

Similarly, when the second light intensity is increased by a third value larger than the third threshold and the fourth intensity is decreased by a fourth value larger than the fourth threshold, the method can proceed to step S33 and determines that the head-mounted apparatus is not in the wearing state. It should be noted that the third threshold and the fourth threshold can be determined according to the light intensities measured in the detection table.

In yet another example, a difference between two of the first through fourth light intensities are monitored in real-time for wearing detection. When the first light intensity is smaller than the third light intensity by a fifth value that is larger than a fifth threshold, and when the second light intensity is smaller than the fourth light intensity by a sixth value that is larger than a sixth threshold, the processing circuit is configured to determine that the head-mounted apparatus is in the wearing state, and the method proceeds to step S33 as shown in FIG. 3. It should be noted that the fifth threshold and the sixth threshold can be determined according to the light intensities measured during an establishment of the detection table.

Therefore, the wearing detection can be precisely performed according to the at least two of the first through fourth light intensities, and mismeasurement and inaccurate measurement issues in the art can be addressed.

Referring to FIG. 3, in response to determining that the head-mounted apparatus is in the wearing state, the sensing method proceeds to step S34: obtaining a heart rate of the user by processing the first through fourth sensed signals.

According to some embodiments of the present disclosure, the heart rate of the user can be measured or derived, directly or indirectly, through bio-parameters such as photoplethysmogram (PPG) waveforms and perfusion indices.

Figure 7:
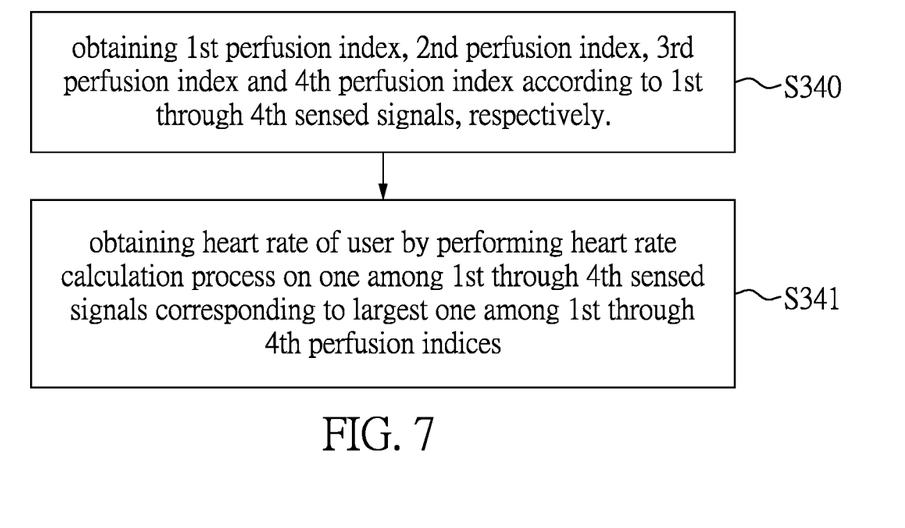
FIG. 7 is a detailed flowchart of step S34.

Reference can be further made to FIG. 7, which is a detailed flowchart of step S34. As shown in FIG. 7, step S34 can include the following steps:

Step S340: obtaining a first perfusion index, a second perfusion index, a third perfusion index and a fourth perfusion index according to the first through fourth sensed signals, respectively.

In step S340, each of the first through fourth perfusion indices can be obtained according to a pulsatile signal and a nonpulsatile signal of each of the first through fourth sensed signals.

Specifically, the perfusion index can be calculated and obtained according to the following equation:

$$PI(\text{Perfusion Index}) = AC/DC * 100\%;$$

where AC represents the pulsatile signal, and DC represents the nonpulsatile signal. More specifically, PI is a ratio of pulsatile blood flow to non-pulsatile static blood flow in the user's peripheral tissue (e.g., the nose), and the pulsatile blood flow and the non-pulsatile static blood flow are associated with the pulsatile signal and the nonpulsatile signal, respectively.

Step S341: obtaining the heart rate of the user by performing a heart rate calculation process on one among the first through fourth sensed signals corresponding to a largest one among the first through fourth perfusion indices.

In this step, higher perfusion index tends to result in better heart rate measurement. Therefore, one of the first through fourth sensed signals corresponding to the largest one of the first through fourth perfusion indices is selected for calculating the user's heart rate, so as to achieve heart rate measurement with high precision.

More specifically, the light intensity of the one among the first through fourth sensed signals corresponding to the largest one among the first through fourth perfusion indices is recorded as a photoplethysmogram (PPG) signal, which can be used to calculate and obtain the heart rate of the user.

In some embodiments, an accuracy of the heart rate obtained from the largest one among the first through fourth perfusion indices can be estimated. More precisely, the largest one of the perfusion indices can be compared to the second largest one of the perfusion indices to estimate the accuracy. That is, when the larger two among the perfusion indices are equal or approximate (e.g., a difference therebetween is lower than a threshold) to each other, it can be ensured that the heart rate obtained from the largest one of the perfusion indices is highly accurate.

Reference is made to FIG. 1 again. According to some exemplary embodiments, a notification can be provided to the user in response to the head-mounted apparatus being in the wearing state and/or the non-wearing state. For example, the notification can be provided through at least one selected from among a vibration device 1, a speaker 15, a display unit 17 (e.g., a projector through the lenses), and a notification light source 19, which can be selectively included in the head-mounted apparatus 1.

In some embodiments, the head-mounted apparatus 1 can communicate, through a wireless communication circuit 13 electrically connected to the processing circuit 18, with various types of electronic devices, such as smartphones, smart watches, smart glasses, and tablet personal computers (PCs), so as to provide the notifications or detection results of the wearing detection and/or the heart rate.

Furthermore, since that the first test light and the second test light emitted at different timings can penetrate through the user's nose and/or be reflected by the user's nose, it can be conceived that another detection table can be established for facial expression recognition. For example, the first through fourth sensed signals can be recorded for different facial expressions, and feature extraction can be performed on the recorded signals to obtain correspondence between extracted features and specific facial expression, thereby the detection table for the facial expression recognition can be established.

Beneficial Effects of the Embodiments

In conclusion, in the head-mounted apparatus and the sensing method provided by the present disclosure, two opposite arrangements are utilized for two light source-sensor pairs, the wearing detection can therefore be precisely performed according to the at least two of the first through fourth light intensities, and mismeasurement and inaccurate measurement issues in the art can be addressed.

In addition, one of the first through fourth sensed signals corresponding to the largest one of the first through fourth perfusion indices can be selected for calculating the user's heart rate, so as to achieve heart rate measurement with high precision.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A head-mounted apparatus, comprising:
   a pair of frames and a bridge part connected between the pair of frames;
   a pair of nose pads connected to the pair of frames, respectively;
   a sensing device, including:
      a first light source and a first light sensor disposed in one of the pair of nose pads according to a first arrangement; and
      a second light source and a second light sensor disposed in another one of the pair of nose pads according to a second arrangement, wherein the first arrangement is opposite to the second arrangement; and
   a processing circuit electrically connected to the sensing device, wherein the processing circuit is configured to:
      control the first light source and the second light source to respectively emit a first test light and a second test light at different timings;
      receive a first sensed signal generated by the first light sensor and corresponding to the second test light;
      receive a second sensed signal generated by the second light sensor and corresponding to the first test light;
      receive a third sensed signal generated by the first light sensor and corresponding to the first test light;
      receive a fourth sensed signal generated by the second light sensor and corresponding to the second test light;
      determine whether or not the head-mounted apparatus is in a wearing state according to the first through fourth sensed signals, and
      obtain, in response to determining that the head-mounted apparatus is in the wearing state, a heart rate of a user by processing the first through fourth sensed signals.

2. The head-mounted apparatus according to claim 1, wherein, when the user wearing the head-mounted apparatus on the user's nose, the first sensed signal is generated by the first light sensor that receives the second test light penetrating through the user's nose, the second sensed signal is generated by the second light sensor that receives the first test light penetrating through the user's nose, the third sensed signal is generated by the first light sensor that receives the first test light reflected from the user's nose, and the fourth sensed signal is generated by the second light sensor that receives the second test light reflected from the user's nose.

3. The head-mounted apparatus according to claim 2, wherein in the step of determining whether or not the head-mounted apparatus is in the wearing state, the processing circuit is further configured to:
   obtain a first light intensity, a second light intensity, a third light intensity and a fourth light intensity from the first through fourth sensed signals, respectively;
   determine whether or not the head-mounted apparatus is in the wearing state according to at least two of the first through fourth light intensities.

4. The head-mounted apparatus according to claim 3, wherein, in response to the first light intensity or the second light intensity being larger than a first threshold and the third light intensity or the fourth light intensity being smaller than a second threshold, the processing circuit is configured to determine that the head-mounted apparatus are not in the wearing state.

5. The head-mounted apparatus according to claim 3, wherein, in response to the first light intensity being increased by a first value larger than a third threshold and the third intensity being decreased by a second value larger than a fourth threshold, the processing circuit is configured to determine that the head-mounted apparatus is not in the wearing state; or in response to the second light intensity being increased by a third value larger than the third threshold and the fourth intensity being decreased by a fourth value larger than the fourth threshold, the processing circuit is configured to determine that the head-mounted apparatus is not in the wearing state.

6. The head-mounted apparatus according to claim 3, wherein, in response to the first light intensity being smaller than the third light intensity by a fifth value that is larger than a fifth threshold, in response to second light intensity being smaller than the fourth light intensity by a sixth value that is larger than a sixth threshold, the processing circuit is configured to determine that the head-mounted apparatus is in the wearing state.

7. The head-mounted apparatus according to claim 1, wherein a first direct path between the first light sensor and the first light source is blocked by a portion of the one of the pair of nose pads, and a second direct path between the second light sensor and the second light source is blocked by a portion of the another one of the pair of nose pads.

8. The head-mounted apparatus according to claim 1, wherein in the step of obtaining the heart rate of the user by processing the first through fourth sensed signals, the processing circuit is further configured to:
   obtain a first perfusion index, a second perfusion index, a third perfusion index and a fourth perfusion index according to the first through fourth sensed signals, respectively; and
   obtain the heart rate of the user by performing a heart rate calculation process on one among the first through fourth sensed signals corresponding to a largest one among the first through fourth perfusion indices.

9. The head-mounted apparatus according to claim 8, wherein each of the first through fourth perfusion indices is obtained according to a pulsatile signal and a nonpulsatile signal of each of the first through fourth sensed signals.

10. The head-mounted apparatus according to claim 8, wherein the heart rate calculation process includes:
    recording a light intensity of the one among the first through fourth sensed signals corresponding to the largest one among the first through fourth perfusion indices as a photoplethysmogram (PPG) signal; and
    calculating and obtaining the heart rate of the user from the PPG signal.

11. A sensing method for a head-mounted apparatus, the head-mounted apparatus including a pair of frames, a bridge part connected between the pair of frames, and a pair of nose pads connected to the pair of frames, respectively, the sensing method comprising:
  providing a sensing device, including:
    a first light source and a first light sensor disposed in one of the pair of nose pads according to a first arrangement; and
    a second light source and a second light sensor disposed in another one of the pair of nose pads according to a second arrangement, wherein the first arrangement is opposite to the second arrangement; and
  configuring a processing circuit to:
    control the first light source and the second light source to respectively emit a first test light and a second test light at different timings;
    receive a first sensed signal generated by the first light sensor and corresponding to the second test light;
    receive a second sensed signal generated by the second light sensor and corresponding to the first test light;
    receive a third sensed signal generated by the first light sensor and corresponding to the first test light;
    receive a fourth sensed signal generated by the second light sensor and corresponding to the second test light;
    determine whether or not the head-mounted apparatus is in a wearing state according to the first through fourth sensed signals, and
    obtain, in response to determining that the head-mounted apparatus is in the wearing state, a heart rate of a user by processing the first through fourth sensed signals.

12. The sensing method according to claim 11, wherein, when the user wearing the head-mounted apparatus on the user's nose, the first sensed signal is generated by the first light sensor that receives the second test light penetrating through the user's nose, the second sensed signal is generated by the second light sensor that receives the first test light penetrating through the user's nose, the third sensed signal is generated by the first light sensor that receives the first test light reflected from the user's nose, and the fourth sensed signal is generated by the second light sensor that receives the second test light reflected from the user's nose.

13. The sensing method according to claim 11, wherein the step of determining whether or not the head-mounted apparatus is in the wearing state further includes:
  obtaining a first light intensity, a second light intensity, a third light intensity and a fourth light intensity from the first through fourth sensed signals, respectively; and
  determining whether or not the head-mounted apparatus is in the wearing state according to at least two of the first through fourth light intensities.

14. The sensing method according to claim 13, wherein, in response to the first light intensity or the second light intensity being larger than a first threshold and the third light intensity or the fourth light intensity being smaller than a second threshold, the processing circuit is configured to determine that the head-mounted apparatus are not in the wearing state.

15. The sensing method according to claim 13, wherein, when the user wearing the head-mounted apparatus on the user's nose, the first sensed signal is generated by the first light sensor that receives the first test light reflected from the user's nose, the second sensed signal is generated by the first light sensor that receives the second test light penetrating through the user's nose, the third sensed signal is generated by the second light sensor that receives the first test light penetrating through the user's nose, and the fourth sensed signal is generated by the second light sensor that receives the second test light reflected from the user's nose.

16. The sensing method according to claim 13, wherein, in response to the first light intensity being smaller than the second light intensity and the fourth intensity being smaller than the fourth light intensity, configuring the processing circuit to determine that the head-mounted apparatus is not in the wearing state.

17. The sensing method according to claim 11, wherein a first direct path between the first light sensor and the first light source is blocked by a portion of the one of the pair of nose pads, and a second direct path between the first light sensor and the first light source is blocked by a portion of the another one of the pair of nose pads.

18. The sensing method according to claim 11, wherein the step of obtaining the heart rate of the user by processing the first through fourth sensed signals, further includes:
  obtaining a first perfusion index, a second perfusion index, a third perfusion index and a fourth perfusion index according to the first through fourth sensed signals, respectively; and
  obtaining the heart rate of the user by performing a heart rate calculation process on one among the first through fourth sensed signals corresponding to a largest one among the first through fourth perfusion indices.

19. The sensing method according to claim 18, wherein each of the first through fourth perfusion indices is obtained according to a pulsatile signal and a nonpulsatile signal of each of the first through fourth sensed signals.

20. The sensing method according to claim 18, wherein the heart rate calculation process includes:
  recording a light intensity of the one among the first through fourth sensed signals corresponding to the largest one among the first through fourth perfusion indices as a photoplethysmogram (PPG) signal; and
  calculating and obtaining the heart rate of the user from the PPG signal.

* * * * *